United States Patent

Andrews, Jr.

[15] 3,657,478

[45] Apr. 18, 1972

[54] INTERCONNECTION BUS SYSTEM

[72] Inventor: John R. Andrews, Jr., Framingham, Mass.

[73] Assignee: Honeywell Inc., Minneapolis, Minn.

[22] Filed: Dec. 30, 1969

[21] Appl. No.: 889,048

[52] U.S. Cl. ....................................178/63, 307/23, 333/32

[51] Int. Cl. ....................H04l 25/02, H02j 1/10, H03h 7/38

[58] Field of Search ................178/63, 63 E, 45; 179/15 AL; 307/23; 333/22, 23, 32, 28

[56] References Cited

UNITED STATES PATENTS 3,321,719 5/1967 Kaenel ....................................333/28

2,281,997 5/1942 Randall ...............................178/63 X 2,768,355 10/1956 Nebel .....................................333/28

3,495,190 2/1970 Ross .......................................333/28

*Primary Examiner*—Kathleen H. Claffy

*Assistant Examiner*—William A. Helvestine

*Attorney*—Fred Jacob and Ronald Reiling

[57] ABSTRACT

In an interconnection bus system, a first impedance network connects at one end of the bus in parallel with a termination provided by a master unit. The termination includes a load impedance for terminating the bus in its characteristic impedance in series with a voltage source for supplying power to the control circuits of a series of devices tapped at different points along the length of the bus. The last device in the series connects to the other end of the bus and includes a second impedance network, complementary to the first, which terminates the bus to ground.

15 Claims, 3 Drawing Figures

Patented April 18, 1972 3,657,478

INVENTOR
JOHN R. ANDREWS, JR.
BY Faith F. Driscoll
ATTORNEY

INTERCONNECTION BUS SYSTEM

BACKGROUND OF THE INVENTION

The present invention relates to interconnection systems, and, more particularly, to an apparatus for terminating both ends of a bidirectional bus system.

Generally, in digital computer systems, digital subsystems and/or digital logic circuits are interconnected through transmission line buses such as coaxial cable, twisted cable lines, microstrip transmission lines, or the like. These digital subsystems frequently comprise a plurality of data processing devices interconnected to a computer. The computer, serving as a master control, issues instructions and data which are selectively accepted by control circuits associated with the data processing devices. Usually, each of the devices are generally separately powered in order to prevent their affecting the operation of the remainder of the system when they either have their power turned off or have a power failure.

To prevent reflections and the above-mentioned cross-talk, each end of the interconnecting cable is terminated in an impedance normally resistive having a value equal to the characteristic impedance of the cable. The impedance then directly couples to a bias voltage potential which serves to supply power to the control circuits associated with each of the data processing devices.

To afford maximum reliability and convenience, the computer or master control powers and terminates one end of the interconnecting cable. Thus, only when the computer power fails is the entire system rendered inoperative. The end of the cable remote from the computer is terminated by and is powered from the last in the series of data processing devices.

A serious disadvantage of the above system arrangement lies in the fact that a power failure in the last device renders the entire system inoperative thereby precluding further processing between the computer and any one of the remaining operative data processing devices.

Some systems include additional cabling to power the end remote from the computer from the computer or master control. This arrangement has the disadvantage of increasing system expense.

It is therefore, an object of the present invention to provide an interconnecting bus system which operates in the event of a power failure to data processing device which terminates a remote end of the bus system.

It is another object of the present invention to provide apparatus for terminating a bus system powered by a master unit without requiring any power from the data processing devices interconnected to the system.

It is a more specific object of the present invention to provide a termination network which directly couples one end of a bus system which interconnects a series of data processing devices for two-way communication and which derives power only from a master control unit directly coupled to the other end of the bus system.

SUMMARY OF INVENTION

The above and other objects are provided according to the basic concept of the invention through an interconnection bus system for a plurality of data processing devices. The system includes first and second impedance networks. The first impedance network directly couples to one end of the bus in parallel with a linear termination including a load impedance in series with a voltage. The second impedance network, complementary to the first, directly couples the other end of the system to ground.

The computer or master control device of the system supplies the single voltage. In this arrangement, the master control can communicate with any other operative system device.

In more particular terms, the invention adds first and second complementary passive impedance networks to a standard interconnection system. The parallel combination of the first impedance network and linear load impedance terminate one end of the interconnection system with an impedance which is less than the characteristic impedance of the bus system. The second impedance network terminates the other end of the bus with an impedance which is greater than the characteristic impedance of the bus system. Accordingly, signals applied to the system are reflected negatively and positively in such a manner as to be successively reduced. The time constants of the impedance networks are selected to prevent the exponential reflections from increasing significantly in magnitude before the reflected signals can be propagated back to cancel the increase.

The above and other objects of the present invention are achieved in an illustrative embodiment described hereinafter. Novel features which are believed to be characteristic of the invention, both as to its organization and method of operation, together with further objects and advantages thereof will be better understood from the following description considered in connection with the accompanying drawings. It is to be expressly understood, however, that these drawings are for the purpose of illustration and description only and are not intended as a definition of the limits of the invention.

DESCRIPTION OF ILLUSTRATIVE EMBODIMENT

Figure 1:
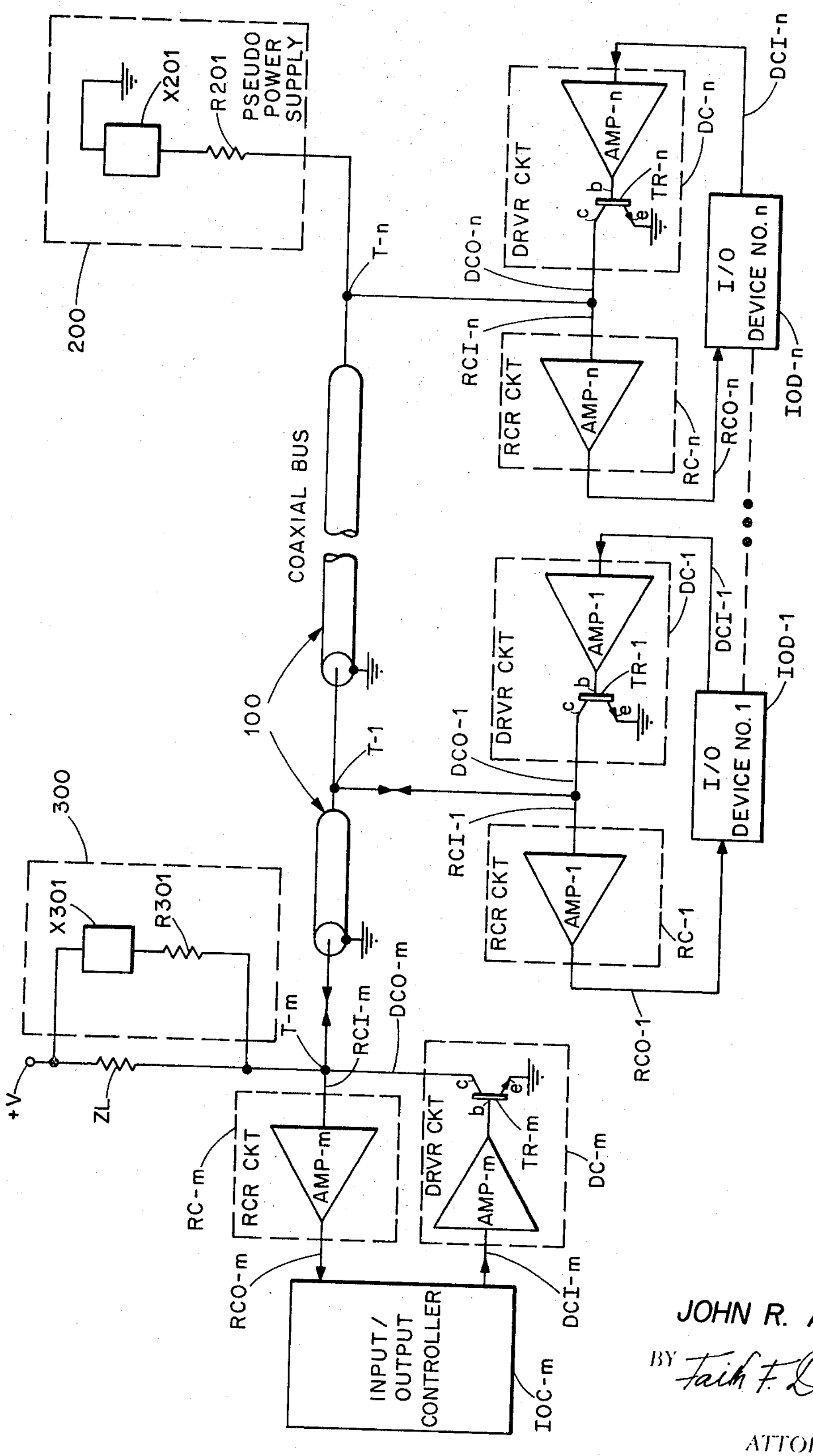
FIG. 1 is a diagrammatic illustration of a bus interconnection system.

Referring now to FIG. 1, there is shown a plurality of data processing units which comprise an input/output controller, and a series of input/output devices, 1 through *n*, tapped to a number of points, referenced as T–*m*, and T1 through T*n*, along a transmission bus 100.

The left end of the bus 100 (i.e., point T–*m*) is terminated by a parallel combination of a load impedance, ZL, and an impedance network 300 which connects to a voltage terminal, referenced as +V in FIG. 1. The right end of the bus 100 is terminated by an impedance network 200, referenced to ground.

In FIG. 1 the input/output controller, referenced as 10C–*m*, and the I/0 devices 1 through *n*, referenced as IOD–1 through IOD–*n*, connect to the bus 100 respectively through line driver and receiver circuits, DC–*m*, RC–*m*, and DC–1, RC–1 through DC–*n*, DC–*n*. The data processing units have their driver circuits, DC–*m*, and DC–1 through DC–*n* connected respectively to input terminals referenced as DCi–*m* and DCi–1 through DCi–*n* in FIG. 1 to receive logic signals, (e.g., binary ONES and ZEROS), from their respective units, IOC and IOD–1 through IOD–*n*.

Output terminals, referenced in FIG. 1 as DCO–*m* and DCO–1 through DCO–*n*, of the driver circuits, DC–*m* and DC–1 through DC–*n*, connect respectively to points T–*m* and T–1 through T–*n* along an inner conductor of bus 100. The outer conductor of the bus 100 connects to ground.

Similarly, the receiver circuits, RC–*m* and RC–1 through RC–*n* have their respective input terminal RCI, referenced as RCI–*m* and RCI–1 through RCI–*n*, connected to the inner bus conductor in common with a corresponding one of the output terminals DCO–*m* and DCO–1 through DCO–*n*, of the driver circuits, DC–*m* and DC–1 through DC–*n*. The receiver circuits, RC–*m* and RC–1 through RC–*n* have their respective output terminals RCO–*m* and RCO–1 through RCO–*n* connected to a corresponding one of the data processing units, IOD–and OID–1 through IOD–*n*.

The driver circuits and the receiver circuits of FIG. 1 can employ any well-known construction operative respectively to transmit fast rise time digital pulses in response to logical signals applied at its input and to convert digital pulses applied thereto into corresponding logic levels. For example, each of the driver circuits can comprise switching logic formed with transistor-transistor logic gates (TTL) of the type described in the text of J. Millman and H. Taub entitled "Pulse, Digital, and Switching Waveforms," McGraw-Hill Book Company, copyright 1965.

In the illustrated embodiment, each of the driver circuits DC–*m* and DC–1 through DC–*n* comprises driver input logic stage, referenced as AMP–*m* and AMP—1 through AMP–*n*, in series with an output transistor stage, referenced as TR–*m* and TR–1 through TR–*n*, connected in a grounded-emitter transistor configuration.

As shown, the signals applied to the input terminals DCI–*m* and DCI–1 through DCI–*n* pass through a corresponding one of the circuits, AMP–*m* and AMP–1 through AMP–*n*, and are then applied to the base electrodes of the output transistors TR–*m* and TR–1 through TR–*n*. The signals applied to the base electrodes are in turn applied to the bus 100 through the collector electrodes of the transistors TR–*m* and TR–1 through TR–*n* which connect respectively to the output terminals DCO–*m* and DCO–1 through DCO–*n*.

Each of the receiver circuits RC–*m* and RC–1 through RC–*n* can comprise conventional emitter followers and logic switches, as disclosed in the aforementioned text of Millman and Taub. Accordingly, each receiver circuit, RC, can comprise a high impedance transistor amplifier which includes an input emitter follower or common collector stage. These stages are referenced as AMP′–*m* and AMP′–1 through AMP′–*n* in FIG. 1.

Figure 2A:
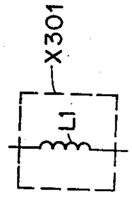
FIG. 2*a* illustrates in greater detail an energy storage device of FIG. 1; and, FIG. 2*b* illustrates in greater detail another energy storage device of FIG. 1.
Figure 2B:
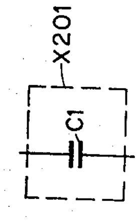

The impedance network 300 of FIG. 1 includes an energy storage device X301 in series with a resistive element R301. The impedance network 200 includes an energy storage device X201, complementary to device X301, in series with a resistive element R201. Both energy storage devices X301 and X201 are detailed respectively in FIGS. 2*a* and 2*b*. The devices X301 and X201 are complementary reactive storage elements which correspond respectively to an inductor L1 and to a capacitor C1.

In FIG. 1, the input/output controller functions as a master control unit. As such, it powers the bus system by its connection to the terminal, +V, and it provides the load impedance, ZL. The input/output devices 1 through *n* are separately powered from voltage sources, not shown. In accordance with invention, the impedance networks 300 and 200 are added as shown in FIG. 1; namely, the impedance network 300 connects in parallel with load impedance, ZL, and the impedance network 200 connects between the point T–*n* and ground. This arrangement as mentioned above, permits the IOC to communicate with any one of the devices IOD–1 through IOD–*n* which are operational i.e., have power).

DESCRIPTION OF OPERATION

Considering the operation of the system of FIG. 1, in general, it is seen that a binary ONE logical signal, applied from any one of the data processing units, IOC and IOD–1 through IOD–*n*, to a corresponding one of the terminals DCI–*m* and DCI–1 through DCI–*n*, is amplified by its respective amplifier stage, AMP.

Under steady state conditions when all devices are non-conductive, the bus 100 is at voltage level which approximates the positive voltage, +V. This voltage level is in turn applied to the collector electrodes of each of the output transistors TR–*m* and TR–1 through TR–*n*. The stage AMP applies the amplified logic signal to the base electrode of its normally non-conductive output transistor, TR, switching it into conduction. Switching one of the transistors, TR, into conduction drives the voltage level, +V, at the collector electrode toward zero volts.

The negative going leading edge of the voltage waveform produced by the driver circuit switching is transmitted in either one or two directions along the length of the bus 100. Specifically, when any one of the driver circuits, DC–1 through DC–*n*–1, applies a voltage waveform to the bus 100, it propagates in both directions (i.e., to the right and to the left in FIG. 1). And, when either driver circuit DC–*m* or DC–*n* produces voltage waveform, it propagates in a single direction.

Each of the receiver circuits, conditioned for receiving, in response to the negative going leading edge of the voltage waveform passes a logic level, representative of a binary ONE, through their respective amplifiers AMP′, and to their respective devices, IOC and IOD–1 through IOD–*n*. The above mentioned receiver circuit conditioning can be accomplished in any well-known manner. For example, the IOC, preliminary to data transmission by a particular device, may selectively activate certain input/output devices to receive the next data transmission.

In order for the bus system of FIG. 1 to operate properly, the voltage of the waveform propagated down the bus 100 when the output driver transistor, TR, is switched either to its conductive or non-conductive state must be the same as if the bus were terminated by a voltage at both ends. Accordingly, each output driver transistor, TR, when switched to its conductive state, normally has two units of current flowing between its collector to emitter electrodes. A unit of current, Io, is defined as the voltage source (i.e., +V) divided by a value of load impedance which equals Zo, the characteristic impedance or surge impedance of the line.

In the illustrated embodiment, the impedance ZL is selected to have a value Ro which is the value for terminating the bus 100 resistively in its characteristic impedance, referred above as Zo. Therefore, the impedance ZL in series with the voltage +V, supplies one unit of current, Io. Additionally, the resistive element R301 is also selected to have a value, Ro, so that at steady state, (i.e., when the impedance of the inductor X301 has a value zero), the network 300 in series with the voltage, +V, supplies a unit of current, Io. In summary, the parallel combination of load impedance, ZL, and network 300 is capable of supplying two units of current (i.e., 2Io). The resistive element R201 is also selected to have a value Ro so that the element R201 in series with charged capacitor C1 is capable of supplying initially, one unit of current, Io.

The currents flowing through the networks 200 and 300 increase and decrease exponentially as a function of the network time constants T200 and T300 (i.e., R201.C1 and L1/R301). When the time constants of each network are made equal, the exponential increase of current through the impedance network 301 and the exponential decrease of current through impedance network 201 compensate one another. By selecting large values of capacitance and inductance for C1 and L1, the sum of the currents supplied by both approximate one unit of current, Io. However, as will be explained herein, compensation is not complete because of the delay in the current waveforms.

Several other important factors are also considered when choosing values for each of the components of the networks 200 and 300. Firstly, in order to minimize the amount of reflections and other system disturbances, the time constants T200 and T300 of the respective networks 200 and 300 must be selected greater than the one way transit time, Td, of the bus 100. This prevents the exponential reflections, described herein, from reaching any significant magnitude before they can be canceled. Secondly, it may be desirable in some instances to select values for L1 and C1 such that the ratio $(L1/C1)^{1/2}$ approximates Ro, the characteristic resistance of the bus 100.

The bus system of the present invention operates by employing predictable multiple reflections. This can be seen more clearly by calculating the coefficients of reflection at each of the points T–*m* and T–*n*. It is well-known that the coefficient of reflection, K may be expressed as:

$$K=(Z-Zo)/(Z+Zo) \quad (1)$$

where

Z = the terminating impedance and

Zo = characteristic impedance of the bus.

From equation (1), it can be seen that:

a. No voltage reflections occur when Z=Zo, that is when the impedances are matched (i.e., K=0);

b. Positive voltage reflections occur when Z is greater than Zo, that is when the bus is over terminated (i.e., K>0);

c. Negative voltage reflections occur when Z is less than Zo, that is when the bus is under terminated (i.e., K<0);

d. Total negative voltage reflections occur when Z=0, that is when the bus is terminated in a short circuit (i.e., K=−1); and, e. Total positive voltage reflections occur when Z=∞, that is when the bus is terminated in an open circuit (i.e., K=1).

Positive reflections mean that the polarity of the reflected voltage waveform is the same as the polarity of the incident voltage waveform, conversely, negative voltage reflections mean that the (i.e., of the reflected voltage waveform is opposite that of the incident voltage waveform.

From equation (1), the coefficients of reflection, K, for points T–*m* and T–*n* (i.e., K(T–*m*) and K(T–*n*)) are calculated as follows. The coefficient of reflection K(T–*m*) is given by the following equation:

$$K(T\text{–}m)=(ZL//Z300)-Zo/(ZL//Z300)+Zo. \quad (2)$$

The complex reflection coefficient K(T–*m*) of equation (2) written in Laplace notation is:

$$K(T\text{–}m)=[ZL(R301+SL1)/(R301+SL1)+ZL-Zo]/[ZL(R301+SL1)/(R301+SL1)+ZL+Zo]. \quad (3)$$

Since Zo has a resistive value of Ro and ZL and R301 both have values of Ro, equation (3) becomes:

$$K(T\text{–}m)=-1/(2SL1/Ro+3). \quad (4)$$

Similarly, the coefficient of reflection K(T–*n*) is given by the equation:

$$K(T\text{–}n)=(Z200-Zo)/(Z200+Zo). \quad (5)$$

The complex reflection coefficient K(T–*n*) of equation (5) written in Laplace notation is:

$$K(T\text{–}n)=(R201+1/SC1-Zo)/(R201+1/SC1+Zo). \quad (6)$$

Substituting into equation (6), the appropriate resistive values for Zo and R201, and simplifying its form, equation (6) becomes:

$$K(T\text{–}n)=1/(2RoC1S+1). \quad (7)$$

It should be noted from equations (4) and (7) that the above coefficients of reflection, K(T–*m*) and K(T–*n*), are functionally dependent upon the time constants T300 and T200 respectively. Accordingly, the voltage and current reflections are exponential. The initial and final values for each of the coefficients of reflection are obtained from equations (4) and (7) by setting the Laplace operator (S) equal to infinity and zero.

From equation (4), the coefficient of reflection K(T–*m*) is calculated to have an initial value of zero and a final value of −⅓. From equation (7), the coefficient of reflection K(T–*n*) is calculated to have an initial value of zero and a final value of +1.

This means that at point T–*m*, the parallel combination of ZL and network 300 absorb the incident voltage waveform and then begin to reflect the waveform negatively at an exponential rate until a steady state is reached (i.e., the time at which all reflections and network effects have terminated) at which one-third of the incident voltage waveform is reflected negatively. Similarly, at point T–*n*, the network 200 initially absorbs the incident voltage waveform and then begins to reflect the waveform positively at an increasing exponential rate until steady state at which the incident voltage waveform is totally reflected.

The reflection coefficient expressing the relationship between reflected and incident current waveforms is the negative of the coefficient for voltage waveforms. Accordingly, the parallel combination of impedance ZL and network 300 absorb and then reflect positively the incident current waveform and the network 200 absorbs and then reflects negatively the incident current waveform.

It will be understood that the above equations assume that the drivers, DR–*m* and DR–*n*, are cutoff. When conductive, each of the drivers at these points, place their respective points at zero impedance (i.e., terminate the bus in a short circuit) thereby eliminating the effects of impedances connected in parallel therewith. In such instances, the coefficient of reflection for voltage waveforms has a value of −1 which means that the incident voltage waveform is totally reflected negatively. The coefficient of reflection for current waveforms is +1 which means the incident current waveform is totally reflected positively.

The operation of the invention will now be explained in greater detail with reference to driving the bus 100 from the driver circuit DC–*n*, the last in the series of I/O devices. As mentioned previously, the network 200 must provide the same voltages and currents as if the bus 100 were terminated at both ends with a voltage source. When the output driver transistor, TR–*n* is switched on, it drops the bus voltage level from +V to zero volts. This change in voltage is transmitted to the left as a negative going waveform (i.e., toward point T–*m*). This change in voltage produces a corresponding change in current of value Io, which is also transmitted toward point T–*m*.

Instantly, current of value Io flows through the network 200 and into the collector to emitter electrodes of driver transistor, TR–*n*. The current through the network 200 starts decreasing exponentially at a rate governed by its time constant T200. After a time delay, Td, the negative voltage waveform arrives at point T–*m*. This produces a current of value Io flowing through impedance ZL. At the same time, current begins to flow through the network 300; the rate of current increase being controlled by time constant T300, shunt load impedance ZL and the resistance of the driving source (bus).

Since the current flowing through the network 300 exceeds the value of the current being delivered to the bus, the parallel combination of impedance ZL and network 300 reflects the incident current waveform positively toward point T–*n*. During this time period, the current through the network 300 is increasing exponentially while the current through the network 200 is decreasing exponentially. At steady state, the network 300 passes a current of value Io and the network 200 passes no current (i.e., capacitor C1 has discharged to zero volts). Therefore, the two units of DC current (2Io) flow through the output driver transistor, TR–*n;* one unit is provided by the branch ZL and the second unit is provided by the network 300.

It will be noted that the current waveform reflected by the network 300 upon arriving at point T–*n* is totally reflected positively by the low impedance presented by conducting driver transistor, TR–*n*. That is, the conducting driver, TR–*n* terminates the bus in a short circuit and therefore, doubles in value the current waveform and re-reflects it toward point T–*m*. The increase in current produced by the arrival of this current waveform at point T–*m*, compensates for the decrease in voltage at point T–*m* caused by the original exponential reflection resulting from the parallel combination of ZL and the network 300.

Since, the time constants of the networks 200 and 300 are selected to be "long" both as the reflected voltage waveform and to the one-way transit, Td, of the bus 100, the exponential reflections never reach any significant magnitude before they are reflected negatively and then re-reflected to cancel with initial waveform. Stated differently, the long time constants maintain slow rates of change in voltage and in current thereby guaranteeing cancellation.

When the output driver transistor, TR–*n*, is later switched to its non-conductive state, it subtracts two units of current. One unit of current flows into the nearest termination (i.e., the network 200) charging the capacitor C1 from zero volts toward +V volts. The other unit of current, as a current waveform, is transmitted along the transmission bus 100. At point, T–*m*, the current waveform, sees an impedance Zo, and therefore the voltage level at that point increases from its previous level to a level +V; that is, the voltage level increase may be expressed as current multiplied by the resistance Ro which equals +V. After a series of multiple reflections, the bus system is at steady state with capacitor, C1, charged to a voltage +V and no current flowing through impedance Z1, networks 200 and 300.

When the bus 100 is driven from a driver circuit connected to a point positioned along the bus between points T–*m* and T–*n* (e.g., point T–1), the operation of the bus system is similar to that described above. In this instance, the short circuit produced by the conductive driver transistor TR–1 causes multiple reflections in two directions. Specifically, multiple reflections of voltage and current waveforms take place between points T–*m* and T–1 and similar multiple reflections of voltage and current take place between points T–*n* and T–1. The multiple reflections in both directions are successively reduced until the bus 100 is at steady state. At steady state, the parallel combination of load impedance ZL and network 300 supplies two units of current (i.e., 2Io). When driver transistor TR–1 is switched off, it again produces multiple reflections between points T–*n* and T–*m* until the bus 100 is again at steady state. The time constants for networks 200 and 300 are selected to control the amount of disturbance produced by the multiple reflections.

By way of illustration only, a circuit according to the invention operated successfully with the component values:

| | |
|---|---|
| Resistors: | Ohms |
| ZL | 75 |
| R201 | 75 |
| R301 | 75 |
| Capacitor: | |
| X201 | 0.0122 microfarads |
| Inductor: | |
| X301 | 68 microhenries |
| Transmission Line: | |
| 100 | 75 ohms (Zo) |
| delay in one direction | 195 nanoseconds |
| Voltage source: | Volts |
| +V | 5.0 |

In summary, the invention provides a termination network which when connected with conventional bus system eliminates the previously required voltage supply. Moreover, connecting the termination network of the invention does not require modification to the conventional bus system with exception of removing a connection to the conventional voltage source termination.

In practice, the invention can be used with changes from the illustrated embodiment and can be used to interconnect various other kinds of master-slave devices (e.g., central processor and peripheral devices; memory controller and memory modules, etc.). Also, other types of voltage driver and receiver circuits can be used. Additionally, the polarities of the voltage source and the conductivity of the transistors can be changed. Further, the elements of each of the networks are not limited to particular values and can be selected to terminate buses having different characteristic impedances. The fact that equal values of were selected for time constants of these networks should not be construed as a limitation. These time constants may be selected to have different values to compensate for certain kinds of noise or other disturbances; as for example, DC losses and receiver circuit threshold characteristics. Further, the value for each of the time constants relative to the one-way transit delay may be selected in accordance with the amount of reflection or disturbance the system can tolerate.

While in accordance with the provisions and statutes, there has been illustrated and described the best form of the invention known, certain changes may be made in the circuits described without departing from the spirit of the invention as set forth in the appended claims and that in some cases, certain features of the invention may be used to advantage without a corresponding use of other features.

Having described the invention, what is claimed as new and novel for which it is desired to secure Letters Patent is:

1. In a digital input/output system for transmitting and receiving logical data pulse signals among a plurality of equipments, said system comprising: a bus; a plurality of pairs of line driver and receiver circuits, each of said pairs for interconnecting a different one of said equipments to different points along and to both ends of said bus, one end of said bus being connected in common with line driver and receiver circuit of a first one of said equipments and to a first load impedance in series with a single fixed voltage potential, said fixed voltage potential connected between said first load impedance and a common reference potential;

a second load impedance means being connected in parallel with said first load impedance; and, a pseudo power supply including a third impedance means connected between the other end of said bus and said common reference potential, said third impedance means including energy storage means for deriving energy for said pseudo power supply only from said data pulse signals and said fixed voltage potential.

2. A transmission line circuit comprising: a transmission line; a plurality of circuits for transmitting electrical signals to and from a series of input/output loads tapped to said transmission line at different points along the length thereof;

a first load impedance connected to said line in common with a first in said series of input/output loads of said circuit;

a source of voltage, said voltage connected between said first load impedance and ground potential;

a first impedance network branch connected in parallel with said first load impedance, said first branch including energy storage means; and, a second impedance network branch including energy storage means, complementary to said first, said second branch being connected to said line between ground potential and a last in said series of input/output loads connected at the other end of said line.

3. A transmission line circuit, the combination comprising:

a transmission line having a uniform characteristic impedance;

a plurality of input/output circuits tapped to each end of said line and at different points along the length thereof;

a source of voltage, said source of voltage being referenced to ground;

a first impedance network, connected between one end of said line and said source of voltage in common with a first one of said input/output circuits, said network including energy storage means; and, a second impedance network branch connected between the other end of said line and said ground reference potential in common with a last one of said input/output circuits, said branch including energy storage means for supplying energy to said line derived only from said input/output circuits and said source.

4. An input/output data transfer bus system including a bus having a predetermined characteristic impedance, an input/output controller directly coupled to one end of said bus and a plurality of input/output devices interconnected for signal transmission to said system by a transistor line driver and receiver circuits having their output and input circuits respectively tapped to said bus at different points along the length thereof, each of said driver circuits including an output transistor of like conductivity type connected in a common emitter configuration and having an emitter electrode and a collector electrode, said emitter electrode being connected to ground potential and said collector electrode being directly coupled to said bus, said bus system further including;

a first resistive element connected in series with the collector-emitter electrodes of said output transistor of said input/output controller, said first resistive element having a value to terminate said bus resistively in said characteristic impedance;

a source of supply voltage potential, said source of supply voltage potential being directly connected between said first resistive element and ground;

a first series combination of a second resistive element and a first energy storage element being connected in parallel with said first resistive element; and, a second series combination of a third resistive element and a second energy storage element complementary to the first, being directly connected between ground and the collector electrode of said output transistor of the input/output device directly coupled to the other end of said bus, whereby the impedance of said parallel combination of said first resistive element and said first series combination and the impedance of said second series combination are selected respectively to under and over terminate said bus in a value less and greater than said characteristic impedance thereby producing predictable multiple reflections for operating said bus as one which is directly coupled at both ends to a source of supply voltage.

5. The bus system of claim 4 wherein said second and said third resistive elements each have values selected to approximate said bus characteristic impedance.

6. The bus system of claim 4 wherein said first and second storage elements respectively are an inductor and a capacitor.

7. The bus system of claim 6 wherein the square root of the ratio of the value of inductance of said inductor to capacitance of said capacitor substantially equals the characteristic impedance of said bus.

8. The bus system of claim 7 wherein said bus has a predetermined time delay in one direction and said inductance and said capacitance are selected to give time constants of reflection greater than said delay.

9. The bus system of claim 4 wherein said first resistive element and said first series combination has an impedance whose value is less than said characteristic impedance for reflecting voltage signals negatively and said second series combination has an impedance whose value is greater than said characteristic impedance for reflecting voltage signals positively.

10. An input/output data transfer bus system including an input/output controller, IOC, and a series of input/output devices IOD–1 through IOD–*n* connected to said bus system by corresponding ones of a plurality of transistor line driver and receiver circuits, DC–*m*, RC–*m*, and DC–1, RC–1 through DC–*n*, RC–*n* having their output and input circuits respectively tapped to said bus at different points, T–*m* and T–1 through T–n along the length thereof, each of said driver circuits, DC–*m* and DC–1 through DC–*n* including an output transistor, TR of like conductivity type and having an emitter electrode and a collector electrode, said emitter electrode being connected to ground potential and said collector electrode being directly coupled to said bus, said bus system further including;

- a collector load resistor, ZL, for said output transistor, TR–*m*, of said input/output controller, IOC, said resistor, ZL, having a value to terminate said bus in its characteristic resistance, Ro;
- a source of voltage potential, +V, said voltage potential being directly connected in series with resistor, ZL;
- a first series combination of a second resistor, R301, and a first energy storage element, X301, being connected in parallel with said first resistor; and,
- a second series combination of a third resistor, R201, and a second energy storage element, X201, being directly connected between ground and the collector electrode of said output transistor, TR–*n*, of the last input/output device, IOD–*n*, in said series.

11. An input/output data transfer bus system including an input/output controller and a series of input/output devices interconnected to said system by a transistor line driver and receiver circuits having their output and input circuits respectively tapped to said bus at different points along the length thereof, each of said driver circuits including an output transistor of like conductivity type connected in the common emitter configuration and having an emitter electrode and a collector electrode, said emitter electrode being connected to ground potential and said collector electrode being directly coupled to said bus, said bus system further including;

- a collector load resistive element for said output transistor of said input/output controller, said resistive element having a value to terminate said bus in its characteristic resistance;
- a source of voltage, said voltage being directly connected in series with said load resistive element, said load resistive element in series with said voltage connected to provide a first unit of current;
- a first series combination of a second resistor and a first energy storage element being connected in parallel with said load resistive element, the impedance of said first combination in series with said voltage selected to provide a first unit of current changing at a first predetermined exponential rate; and,
- a second series combination of a third resistor and a second energy storage element, complementary to said first, being directly coupled between ground and the collector electrode of said output transistor of the last input/output device in said series, said second series combination selected to have an impedance value which provides a second unit of current, complementary to said first, changing at a second exponential rate.

12. The system according to claim 10 wherein each of said resistors R201 and R301 have a value Ro, said first storage element X301 is an inductor, L1, having a predetermined value of inductance, said second storage element X201 is a capacitor, C1, having a predetermined value of capacitance and the coefficient of reflection K for each of said points T–*m* and T–*n* are defined as follows:

$K(T\text{–}m)=1/(2SL1/Ro+3)$ and $K(T\text{–}n)=1/(2RoC1S+1)$.

13. The system according to claim 12 wherein the values for time constants defined by L1/Ro and RoC1 are selected to be equal.

14. The system according to claim 12 wherein the values for time constants defined by L1/Ro and RoC1 are selected to be unequal.

15. The system according to claim 11 wherein said first energy storage element and second energy storage elements are respectively an inductor and a capacitor.

* * * * *